Jan. 17, 1967  J. L. BUTLER  3,298,331
ROTARY HEAT ENGINE
Filed April 15, 1965  3 Sheets-Sheet 2
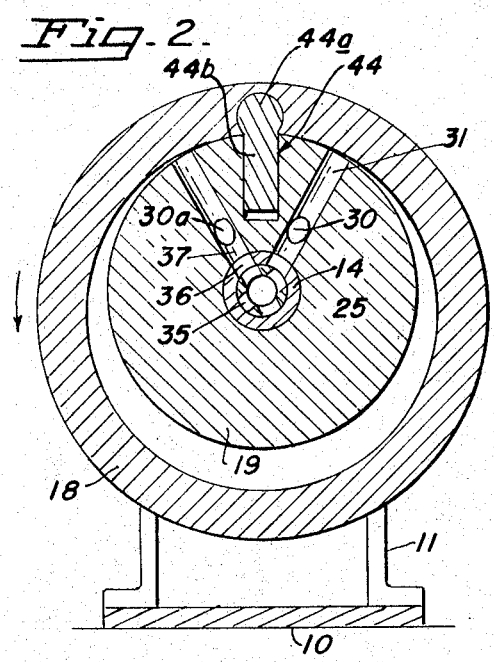
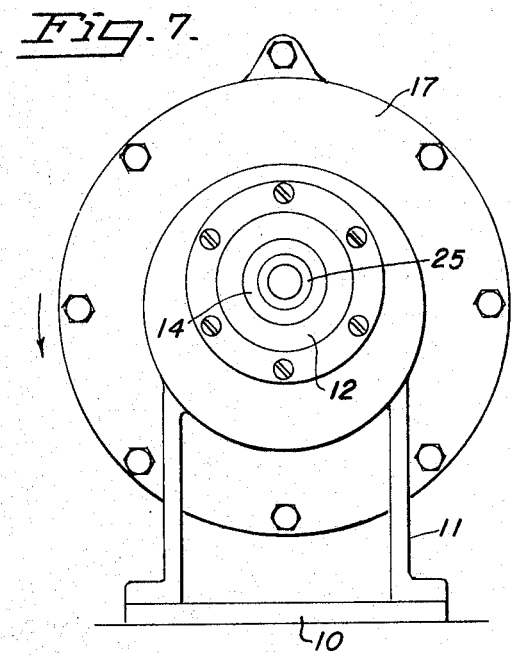
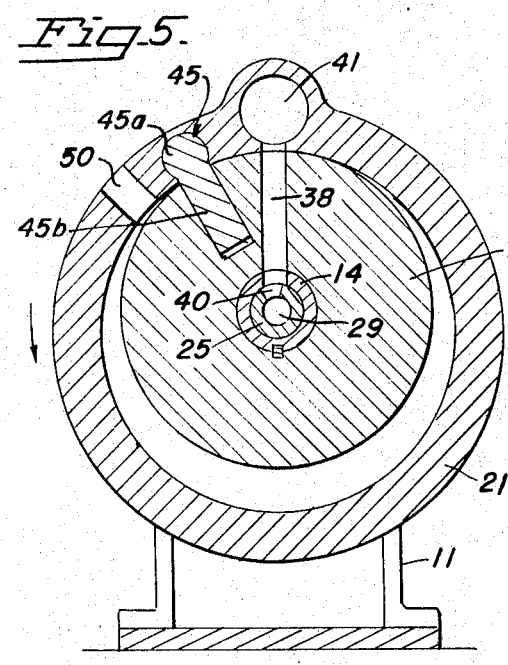
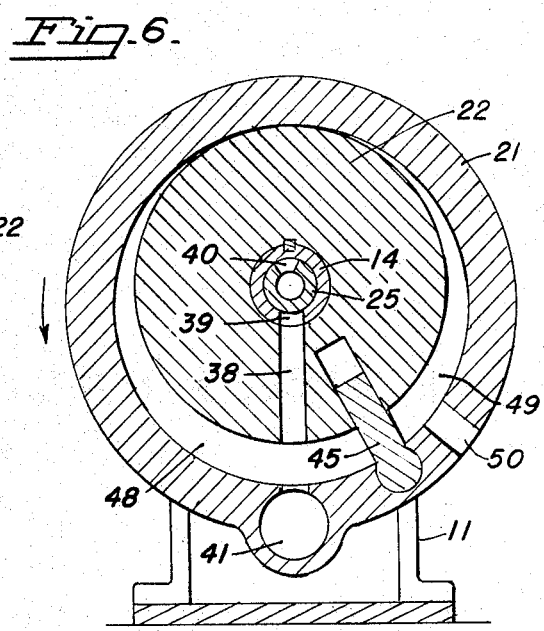
INVENTOR
JAMES L. BUTLER
BY J.E. Trabucco
ATTORNEY

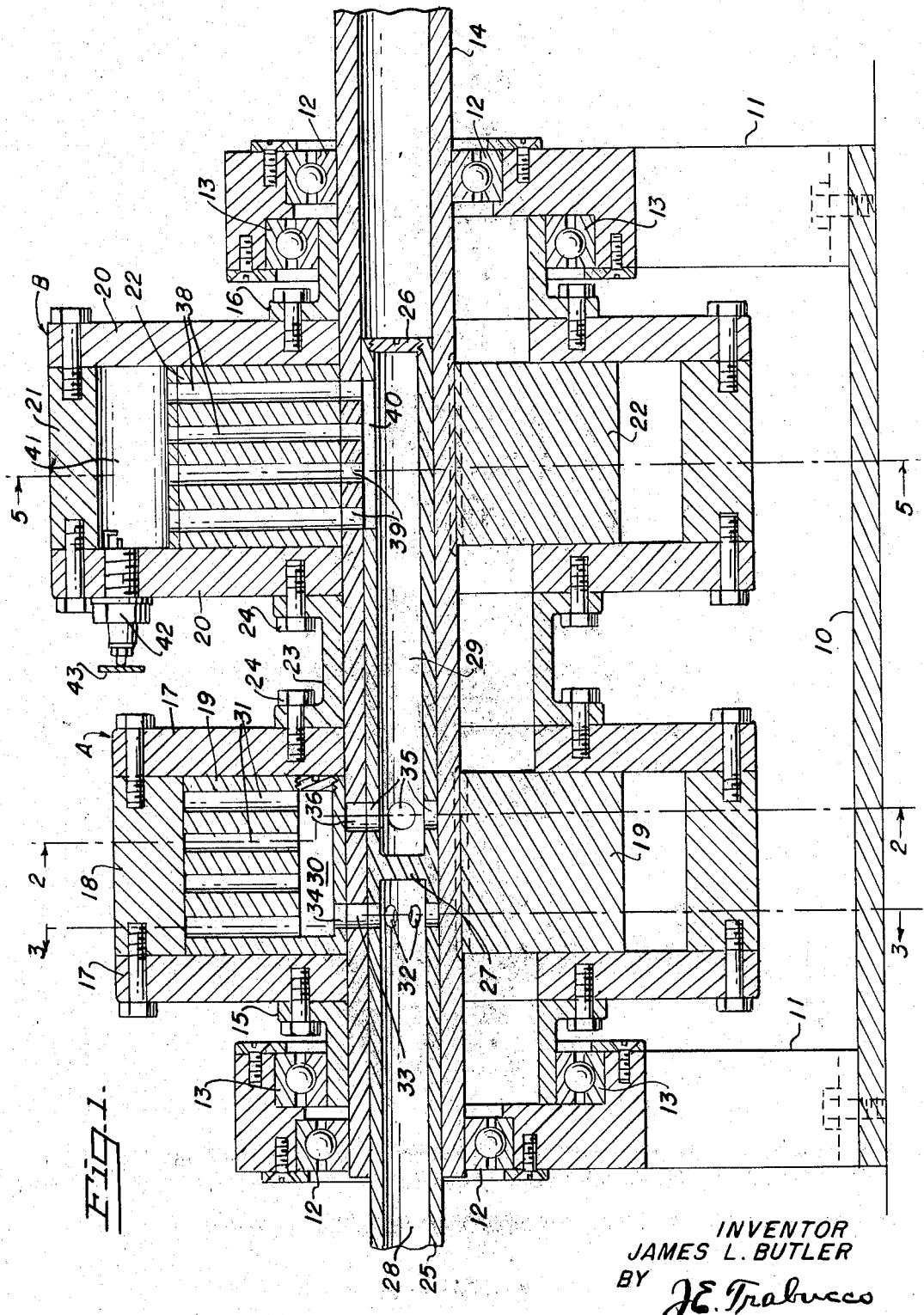

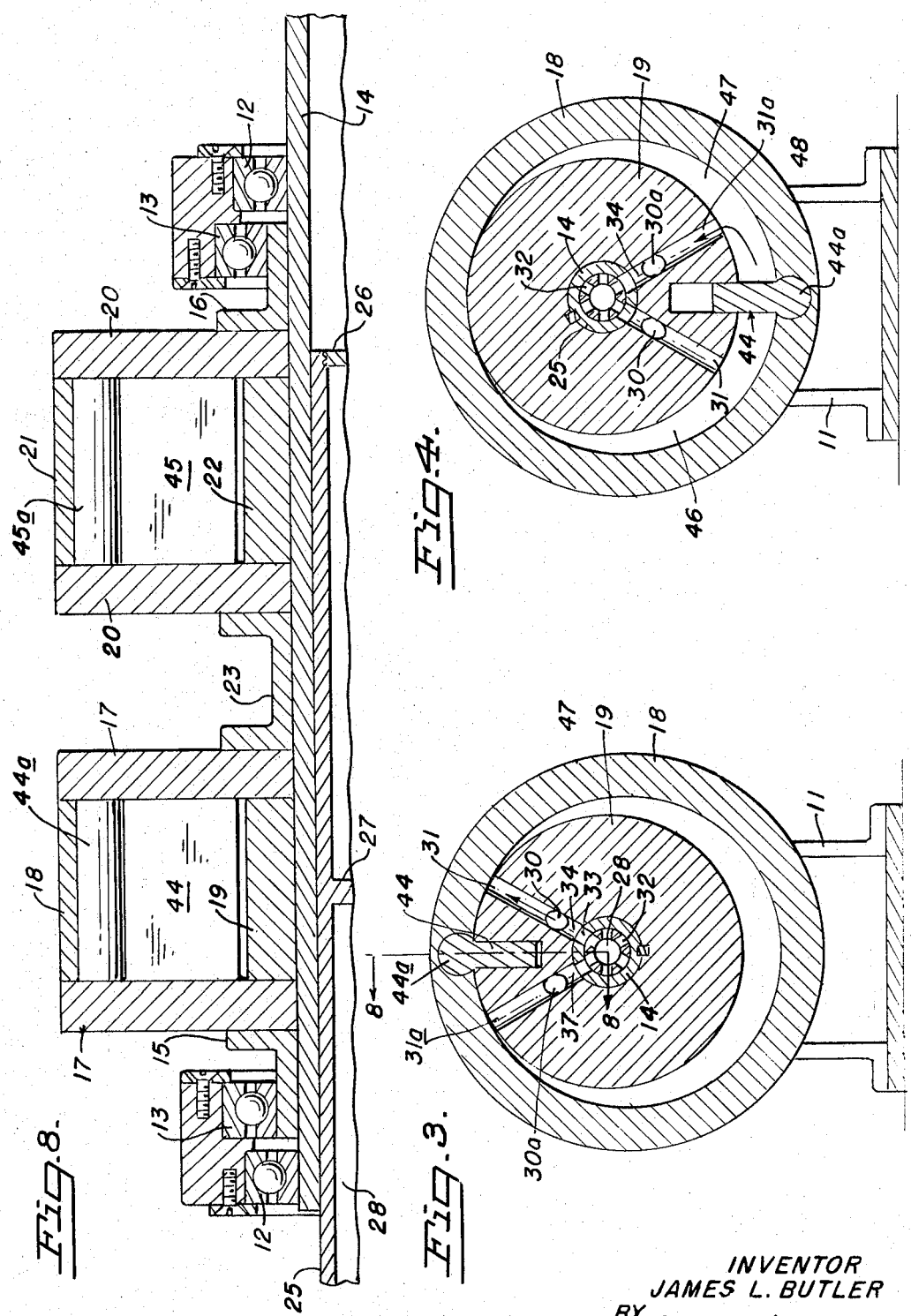

United States Patent Office 3,298,331
Patented Jan. 17, 1967

3,298,331
ROTARY HEAT ENGINE
James L. Butler, Box 134, Montara, Calif. 94037
Filed Apr. 15, 1965, Ser. No. 448,316
4 Claims. (Cl. 123—8)

This invention relates to rotary engines and more particularly to a novel rotary internal combustion engine comprising a fuel compressor unit and a combustion-power unit coupled together to provide an improved engine of novel design and construction.

The primary object of the present invention is to provide a novel rotary internal combustion engine embodying a fuel compressor unit and a combustion-power unit coupled together and mounted for rotary movement, the fuel compressor unit functioning to withdraw fuel from a source of fuel supply and force it into the combustion unit where it is ignited to supply the power cycle.

The engine embodying my invention comprises a fuel compressor unit and a combustion-power unit, each having an outer rotor and an inner rotor linked together by a moving blade or buttress but rotatable about eccentric axes. The power unit embodies a moving blade which functions to separate the expansion-power compartment from the exhaust compartment, and similarly a blade of the compressor unit functions to separate the intake compartment from the compression compartment. As the compressor unit and the power unit rotate in unison in the same direction, carbureted fuel is drawn into the compressor unit from a suitable source of supply and forced by the circularly moving blade of the compressor unit through an induction tube and an intake port of the power unit and finally into the combustion chamber of such power-combustion unit where it is ignited to provide the expansive power to drive the blade of the power-combustion unit circularly to rotate the compressor and power units and a tubular shaft keyed thereto. Following the forcing of the fuel into the combustion chamber, the intake port is closed, and a spark plug communicating with the combustion chamber and carried circularly by the outer rotor of the power unit makes contact with a suitable spark contact member connected to a source of electrical energy and ignites the fuel in the combustion chamber to produce the driving power to actuate the blade of the power unit circularly to rotate the engine. The circularly moving blade of the power unit subsequently causes the evacuation of the gases of combustion through an exhaust opening in the outer rotor of the power unit.

Other and further objects of my invention will be pointed out hereinafter or will be indicated in the appended claims or will be obvious to one skilled in the art upon an understanding of the present disclosure. For the purposes of this application, I have elected to show herein certain forms and details of a rotary internal combustion engine which is representative of my invention; it is to be understood, however, that the embodiment of my invention herein shown and described is for purposes of illustration only, and that therefore it is not to be regarded as exhaustive of the variations of the invention in the art.

In the accompanying drawings:

FIG. 1 is a longitudinal sectional view, taken vertically through a rotary engine embodying the principles of my invention;

FIG. 2 is a vertical sectional view taken on the line 2—2 of FIG. 1;

FIG. 3 is a vertical sectional view taken on the line 3—3 of FIG. 1;

FIG. 4 is a diagrammatic vertical sectional view corresponding somewhat to FIG. 3 but showing the relative positions of the inner and outer rotors of the compressor unit when rotated through one hundred eighty degrees;

FIG. 5 is a diagrammatic vertical sectional view taken on the line 5—5 of FIG. 1;

FIG. 6 is a diagrammatic vertical sectional view corresponding somewhat to FIG. 5 but showing the relative positions of the inner and outer rotors of the power unit when rotated through one hundred eighty degrees;

FIG. 7 is an end view of the engine; and

FIG. 8 is a longitudinal sectional view taken on the line 8—8 of FIG. 3.

In the embodiment of my invention shown on the drawings, the numeral 10 designates a base having standards 11, 11 upon which are supported sets of bearings 12, 12 and 13, 13 arranged eccentrically with respect to each other. In the bearings 12 is rotatably supported a tubular drive shaft 14, and journaled in the bearings 13 are flanged hub members 15 and 16. Secured as by bolts to the hub member 15 is one of two opposed housing plates 17 which are bolted to an outer rotor 18 of hollow cylindrical form having a cylindrical chamber, such outer rotor being eccentric to the shaft 14. Between the housing plates 17 and inside the outer rotor 18 there is mounted on and keyed to the shaft 14 an inner cylindrical rotor 19 of less diameter than the outer rotor, such inner rotor engaging tangentially and constantly at its periphery with the inner cylindrical surface of the outer rotor. The outer and inner rotors 18 and 19 are eccentrically arranged with respect to each other, and in combination they comprise essential components of the compressor or pump unit A of the engine.

Secured as by bolts to the hub member 16 is one of two opposed housing plates 20 which are bolted to an outer rotor 21 of hollow cylindrical form having a cylindrical chamber, such outer rotor being eccentric to the shaft 14. Between the housing plates 20 and inside the outer rotor 21 there is mounted on and keyed to the shaft 14 a cylindrical inner rotor 22 of less diameter than such outer rotor, the said inner rotor engaging tangentially and constantly at its periphery with the inner cylindrical surface of the outer rotor. The outer and inner rotors 21 and 22 are eccentrically arranged with respect to one another, and in combination they comprise essential components of the power unit B of the engine. The inner adjacent housing plates 17 and 20 of the compressor and power units A and B, respectively, are connected together by suitable means such as a flanged hub member 23 and bolts 24.

Fitting loosely in the tubular shaft 14 is a fuel induction tube 25 which is connected to a suitable source of carbureted fuel. The tube 25 extends into the tubular shaft 14 beyond the inner rotor 22, and its inner end is completely closed as at 26. The interior of the fuel induction tube 25 is provided with a partition 27 dividing such tube into an inlet compartment 28 and an outlet compartment 29. The inner rotor 19 is formed with a transversely disposed fuel intake manifold 30 and a transversely disposed fuel outlet manifold 30a, such manifolds being positioned substantially thirty degrees apart. The intake manifold 30 communicates with a plurality of transversely aligned radial fuel inlet ducts 31, and the fuel outlet manifold 30a communicates with a plurality of transversely aligned radial fuel outlet ducts 31a, such sets of ducts being positioned substantially thirty degrees apart. Suitable openings or ports 32 in the fuel induction tube 25 communicating with the fuel inlet compartment 28 of such tube are positioned to register with inlet openings or ports 33 and 34 in the shaft 14 and the inner rotor 19, respectively, to admit fuel into the intake manifold 30 as the shaft rotates. At the opposite side of the partition 27, the fuel induction tube 25 is provided with a plurality of larger outlet openings or ports 35, which are in communication with the outlet compartment 29 of the fuel induction tube and with the outlet manifold 30a, such outlet openings being positioned to register with suitable openings or ports 36 and 37 in the shaft 14 and the inner rotor 19, respectively, to allow fuel to be forced from the outlet manifold 30a into the outlet compartment 29 of the fuel induction tube.

Extending radially through the inner rotor 22 of the power unit B are a plurality of transversely aligned fuel ducts 38 which are positioned in registry with a similar number of longitudinally aligned inlet openings or ports 39 in the shaft 14. An elongated slotted intake opening or port 40 in the fuel induction tube 25 communicating with the outlet compartment 29 of the shaft 14 is arranged to communicate with the openings 39 in the shaft and with the fuel ducts 38 with each rotation of the shaft and the inner rotor 22.

The outer rotor 21 of the power unit B is provided near its periphery with a combustion chamber 41 which is arranged to communicate with the fuel ducts 38 upon each revolution of the power unit, to admit thereby a suitable charge of fuel into such combustion chamber. The combustion chamber 41 is also adapted to communicate with the space between the outer rotor 21 and the inner rotor 22.

Screwed into the inner housing plate 20 of the outer rotor 21 is a spark plug 42 extending into the combustion chamber 41, which on each revolution of such outer rotor 21 makes contact with an electrical wiper 43 connected to a suitable source of electrical energy to produce a spark to ignite the fuel in such combustion chamber.

The outer rotor 18 and the inner rotor 19 of the compressor unit A are coupled together so they rotate in unison by a transverse, radially arranged blade or buttress member 44 having a semi-cylindrical outer portion 44a movably held in a transverse socket in the outer rotor and a plate portion 44b movably positioned in a transverse radial slot in the inner rotor.

Similarly, the outer rotor 21 and the inner rotor 22 of the power unit B are coupled together so they rotate in unison by a radial transverse blade or buttress member 45 having a semi-cylindrical outer portion 45a movably held in a transverse socket in the outer rotor 21 and a plate portion 45b movably lodged in a transverse radial slot in the inner rotor 22. The blades 44 and 45 have substantially the same widths as the inner rotors 19 and 22, respectively. The blade 44 of the compressor unit A is centrally positioned between the intake and outlet ducts 31 and 31a, and such blade functions to separate the intake chamber 46 and the compression chamber 47 (FIG. 4). The blade 45 of the power unit B functions to separate the expansion chamber 48 from the exhaust chamber 49 (FIG. 6).

In operation, the rotation of the engine in the direction indicated by the arrows draws a fuel mixture from a suitable source of supply into the intake compartment 28 of the fuel induction tube 25, through the openings 32 in the said tube, through the opening 33 in the shaft 14, through the opening 34 in the inner rotor 19 and into the fuel intake manifold 30. From the intake manifold, the fuel mixture enters and flows through the inlet ducts 31 in the inner rotor 19 and into the intake chamber 46. As the engine continues to rotate, the blade 44, coupling the outer and inner rotors 18 and 19 so they rotate in unison in the same direction, compresses the fuel in the compression chamber 47 and forces it through the fuel outlet ducts 31a, the outlet manifold 30a, through the openings 37 and 36 in the inner rotor 19 and the shaft 14, respectively, and into the outlet compartment 29 of the fuel induction tube 25. The compressed fuel is expelled from the outlet compartment 29 of the fuel induction tube through the slotted intake opening 40 in the said tube, through the inlet openings 39 in the shaft 14 and then through the fuel ducts 38 in the inner rotor 21. With each revolution of the engine, the intake openings 39 in the shaft 14 register momentarily with the slotted intake openings 40 in the fuel induction tube 25 to allow a charge of fuel to be forced through the openings 39 and the fuel ducts 38 and into the combustion chamber 41. Immediately following the charging of the combustion chamber 41 with the fuel mixture, the spark plug 42 makes contact with the electrical wiper 43 to create a spark and ignite the fuel.

When the engine rotates sufficiently in the direction of the arrows to produce a portion of the expansion chamber 48, the expanding gases of combustion enter the said expansion chamber 48 from the combustion chamber 41 to exert the power to actuate the blade 45 circularly to rotate the engine. Simultaneously the gases of combustion from the preceding cycle are being evacuated from the exhaust chamber 49 through the exhaust port 50. When the combustion of the fuel in the combustion chamber 41 takes place, the intake opening 40 in the fuel induction tube 25 is closed.

What I claim is:

1. In a rotary engine, a compressor unit and a power unit coupled together for simultaneous rotation in the same direction about a common axis, each unit comprising an outer rotor having a cylindrical chamber and a cylindrical inner rotor of less diameter than the chamber and tangentially engaging the inner cylindrical wall of such chamber constantly, each unit having a radial blade coupling the outer and inner rotors of each unit to cause the rotors of each unit to rotate in unison, the outer rotor of each unit having a socket movably holding the blade, and the inner rotor of each unit having a radial slot to receive movably a portion of such blade, the blade of the compressor unit extending across the space between the inner and outer rotors of such compressor unit to divide such space into intake and compression chambers, the blade of the power unit extending across the space between the inner and outer rotors of such power unit to divide such space into expansion and exhaust chambers, a hollow drive shaft keyed to the inner rotors of the compressor and power units and arranged eccentrically to the common axis of the compressor and power units, a fuel induction tube extending loosely inside the shaft and having separated inlet and outlet chambers, means to convey a fuel mixture from the inlet chamber of the fuel induction tube to the intake chamber of the compressor unit, means to convey the fuel mixture from the compression chamber of the compressor unit to the outlet chamber of the fuel induction tube, a combustion chamber carried by the outer rotor of the power unit, the combustion chamber being arranged to communicate with the expansion chamber intermittently, means to supply the combustion chamber intermittently with a charge of the fuel mixture from the outlet chamber of the induction tube, means to fire each charge at predetermined positions of the rotors, and means to exhaust the gases of combustion from the exhaust chamber.

2. In a rotary engine, a compressor unit and a power unit coupled together for simultaneous rotation in the same direction, each unit comprising an outer rotor having a cylindrical chamber and a cylindrical inner rotor of less diameter than the chamber and tangentially engaging the inner cylindrical wall of such chamber constantly, each unit having a radial blade coupling the outer and inner rotors of each unit to cause the rotors of each unit to rotate in unison, the outer rotor of each unit having a transverse socket movably holding an end portion of the blade and the inner rotor of each unit having a radial slot to receive movably a portion of such blade, the blade of the compressor unit dividing the space between the inner and outer rotors of such compressor unit into intake and compression chambers, the blade of the power unit dividing the space between the inner and outer rotors of such power unit into expansion and exhaust chambers, a hollow drive shaft keyed to the inner rotors of the compressor and power units, such shaft being accentrically arranged to the outer rotors of the units, a fuel induction tube extending loosely inside the shaft and having separated fuel inlet and outlet chambers, means to convey a fuel mixture from the inlet chamber of the induction tube to the intake chamber of the compressor unit, means to convey the fuel mixture from the compression chamber of the compressor unit to the outlet chamber of the induction tube, a combustion chamber carried by the outer rotor of the power unit, the combustion chamber being arranged to communicate with the expansion chamber intermittently, means to convey a charge of the fuel mixture from the outlet chamber of the induction tube to the combustion chamber intermittently, a spark producing device carried by the outer rotor of the power unit, such device communicating with the combustion chamber to ignite the fuel mixture charge intermittently, electrical wiper means connected to a source of electrical energy, the said wiper means being arranged to make contact with the spark producing device upon each revolution of the outer housing of the power unit to ignite the fuel charge, and means to exhaust the gases of combustion from the exhaust chamber.

3. In a rotary engine, an outer rotor having a cylindrical chamber, a cylindrical inner rotor of less diameter than the chamber and tangentially engaging the cylindrical wall of the chamber constantly, the outer rotor mounted for rotation on its axis, a drive shaft keyed to the inner rotor, such drive shaft being eccentric to the axis of the outer rotor, a radial blade coupling the inner and outer rotors to cause the rotors to rotate in unison, the outer rotor having a transverse socket movably holding one end of the blade and the inner rotor having a radial slot to receive a portion of the blade slidably, the said blade dividing the space between the inner and outer rotors into expansion and exhaust chambers, a combustion chamber carried by the outer rotor, the combustion chamber being arranged to communicate with the expansion chamber intermittently, means to supply the combustion chamber intermittently with an explosive charge, means to fire each charge at a predetermined position of the rotors, and means to exhaust the gases of combustion from the exhaust chamber.

4. In a rotary engine, an outer rotor having a cylindrical chamber, a cylindrical inner rotor of less diameter than the chamber and tangentially engaging the cylindrical wall of such chamber constantly, the outer rotor mounted for rotation on its axis, a tubular drive shaft keyed to the inner rotor, such drive shaft being eccentric to the axis of the outer rotor, a radial blade coupling the inner and outer rotors to cause the rotors to rotate in unison in the same direction, the outer rotor having a transverse socket movably holding an end of the blade and the inner rotor having a radial slot to receive a portion of the blade slidably, the said blade dividing the space between the outer and inner rotors into expansion and exhaust chambers, a combustion chamber carried by the outer rotor, the combustion chamber being arranged to communicate with the expansion chamber intermittently when the rotors are in predetermined relative positions, a fuel induction tube loosely positioned inside the drive shaft and having a compartment to receive a supply of a fuel mixture, means to supply the combustion chamber with charges of the fuel mixture intermittently from the compartment of the induction tube when such combustion chamber is not in communication with the expansion chamber, means to fire each charge intermittently when the rotors are in predetermined positions, and means to exhaust the gases of combustion from the exhaust chamber.

References Cited by the Examiner

UNITED STATES PATENTS

| | | | |
|---|---|---|---|
| 791,428 | 5/1905 | Lawrence | 91—70 |
| 969,957 | 9/1910 | Jacobs | 123—8 |
| 1,210,042 | 12/1916 | Bullard | 123—8 |
| 1,410,099 | 3/1922 | Hansen | 123—8 |
| 1,828,245 | 10/1931 | Davidson | 91—70 |
| 2,075,561 | 3/1937 | Wellensiek | 123—8 |

FOREIGN PATENTS 9,242/1932  8/1933  Australia.

DONLEY J. STOCKING, *Primary Examiner.*

W. J. GOODLIN, *Assistant Examiner.*